(12) United States Patent
Bertin et al.

(10) Patent No.: US 11,142,488 B2
(45) Date of Patent: Oct. 12, 2021

(54) METHODS AND SYSTEMS FOR COATING GRANULAR SUBSTRATES

(75) Inventors: Marcus Anthony Bertin, Dublin, OH (US); Laurence G. Dammann, Hilliard, OH (US); Robert M. A. Radabaugh, Marysville, OH (US); Arthur R. Shirley, Florence, AL (US); Willem L. C. van Pol, Montfort (NL)

(73) Assignee: EVERRIS INTERNATIONAL B.V., Heerlen (NL)

( * ) Notice: Subject to any disclaimer, the term of this patent is extended or adjusted under 35 U.S.C. 154(b) by 0 days.

(21) Appl. No.: 13/984,471

(22) PCT Filed: Feb. 9, 2012

(86) PCT No.: PCT/US2012/024459
§ 371 (c)(1),
(2), (4) Date: Oct. 21, 2013

(87) PCT Pub. No.: WO2012/109432
PCT Pub. Date: Aug. 16, 2012

(65) Prior Publication Data
US 2014/0033779 A1    Feb. 6, 2014

Related U.S. Application Data

(60) Provisional application No. 61/441,180, filed on Feb. 9, 2011.

(51) Int. Cl.
*C05C 9/00* (2006.01)
*A01N 25/26* (2006.01)
(Continued)

(52) U.S. Cl.
CPC ............. *C05C 9/005* (2013.01); *A01N 25/26* (2013.01); *B01J 2/006* (2013.01); *B01J 2/10* (2013.01); *C05G 5/37* (2020.02)

(58) Field of Classification Search
CPC ...................................................... C05C 9/005
(Continued)

(56) References Cited

U.S. PATENT DOCUMENTS 3,074,845 A * 1/1963 Geary ................... A01N 25/26
424/419
3,223,518 A    12/1965 Hansen
(Continued)

FOREIGN PATENT DOCUMENTS

CA    2115998 A1    3/1993
CL       042420       4/1999
(Continued)

OTHER PUBLICATIONS

Special Chem Website, AMICURE 33-LV, p. 1, Accessed: Aug. 25, 2014.*
(Continued)

*Primary Examiner* — Tabatha L Penny
(74) *Attorney, Agent, or Firm* — Hoyng Rokh Monegier B.V.; David P. Owen

(57) ABSTRACT

A process for producing a coated particle to provide controlled release characteristics. In this process the mixing of the substrate and coating is made in a mixing device and that mixture is then transferred to a reactor vessel different from the mixing device where the chemical curing of the coating over the particles takes place. Several layers of coating can be applied by repeating the steps and it can be run in a fully continuous manner.

16 Claims, 4 Drawing Sheets

(51) Int. Cl.
*B01J 2/10* (2006.01)
*B01J 2/00* (2006.01)
*C05G 5/30* (2020.01)

(58) Field of Classification Search
USPC .......................................................... 427/220
See application file for complete search history.

(56) References Cited

U.S. PATENT DOCUMENTS

| | | | |
|---|---|---|---|
| 3,259,482 | A | 7/1966 | Hansen |
| 3,264,088 | A | 8/1966 | Hansen |
| 3,264,089 | A | 8/1966 | Hansen |
| 3,285,223 | A | 11/1966 | Sahlin |
| 4,019,890 | A | 4/1977 | Fujita et al. |
| 4,549,897 | A | 10/1985 | Seng et al. |
| 4,602,440 | A | 7/1986 | Genoni |
| 4,772,490 | A * | 9/1988 | Kogler ................... A01N 25/26 427/212 |
| 5,186,732 | A | 2/1993 | Thompson et al. |
| 5,399,186 | A * | 3/1995 | Derrah ....................... B01J 2/16 118/303 |
| 5,653,782 | A * | 8/1997 | Stern et al. ........................ 71/53 |
| 5,938,813 | A | 8/1999 | Araya et al. |
| 6,391,454 | B1 * | 5/2002 | Mao et al. .................... 428/407 |
| 7,722,696 | B2 | 5/2010 | Winter et al. |
| 8,178,161 | B2 | 5/2012 | Xing et al. |
| 2002/0011088 | A1 * | 1/2002 | Peacock et al. ............. 71/64.02 |
| 2003/0227814 | A1 | 12/2003 | Priesnitz et al. |
| 2004/0016276 | A1 | 1/2004 | Wynnyk et al. |
| 2004/0076073 | A1 | 4/2004 | Yao et al. |
| 2005/0005661 | A1 * | 1/2005 | Winter et al. ................ 71/64.02 |
| 2005/0076687 | A1 | 4/2005 | Whittington |
| 2006/0000252 | A1 * | 1/2006 | Carstens et al. ............. 71/64.02 |
| 2009/0041819 | A1 * | 2/2009 | Tagami .................. A01N 25/26 424/408 |
| 2012/0008457 | A1 | 1/2012 | Neier et al. |

FOREIGN PATENT DOCUMENTS

| | | | |
|---|---|---|---|
| CL | 042510 | 5/2001 | |
| CN | 101357872 | 2/2009 | |
| CN | 101648837 | 2/2010 | |
| DE | 10 2006 060977 | 6/2008 | |
| EP | 0599927 A1 * | 6/1994 | .......... C05G 3/0029 |
| EP | 1 990 085 | 11/2008 | |
| ES | 2075793 A1 | 10/1995 | |
| JP | S48-041991 B4 | 12/1973 | |
| JP | H05-098361 A | 4/1993 | |
| JP | H10-074779 A | 3/1998 | |
| JP | H10-324587 A | 12/1998 | |
| JP | 2005-163130 A | 6/2005 | |
| JP | 2007-526939 A | 9/2007 | |
| JP | 2010-202482 A | 9/2010 | |
| JP | 2011-016685 A | 1/2011 | |
| WO | 2005080325 A1 | 9/2005 | |
| WO | WO 2006/079228 | 8/2006 | |
| WO | WO 2010/006406 | 2/2010 | |

OTHER PUBLICATIONS

Written Opinion of the International Searching Authority for International Patent Application No. PCT/US2012/024459 dated Aug. 13, 2013.

U.S. Appl. No. 61/441,168, filed Feb. 9, 2011.

* cited by examiner

METHODS AND SYSTEMS FOR COATING GRANULAR SUBSTRATES

CROSS-REFERENCE TO RELATED APPLICATIONS

This patent application is a national stage application of International Patent Application No. PCT/US2012/024459, filed Feb. 9, 2012, which claims priority to U.S. Provisional Patent Application No. 61/441,180, filed Feb. 9, 2011, the disclosures of each of which are herein incorporated by reference.

BACKGROUND OF THE INVENTION (a) Field of the Invention

The present invention relates to methods and systems for coating granular substrates such as fertilizers.

(b) Description of the Related Art

The concept of a controlled release fertilizers is well known in the art. These fertilizers are typically manufactured by applying a coating to the fertilizer to form a coated mixture and curing the coated mixture, i.e., forming a coated fertilizer with one layer of coating, in a single reaction vessel such as a rotating drum or pan. Additional layers of coating may be applied by the same process, i.e., coating and curing in a single reaction vessel.

For example, U.S. Pat. No. 3,223,518, which is hereby incorporated by reference in its entirety, discloses granular, particulate, or pelletized fertilizers encapsulated by a water-insoluble, non-hygroscopic organic resinous encapsulating coating. To obtain the controlled release characteristics, this patent discloses a fertilizer encapsulated by a plurality of coatings obtained by a process of coating and curing the fertilizers in a single rotating drum.

U.S. Pat. No. 3,285,223, which are hereby incorporated by reference in its entirety, discloses coating and encapsulating granular materials with a plurality of coatings with a specifically designed apparatus that provides heating, blowing, and rotating means in a single vessel. This patent describes the apparatus as a "curing chamber for the oxidation or polymerization of liquid coating" materials.

U.S. Pat. Nos. 4,772,490 and 7,722,696, which is hereby incorporated by reference in their entireties, developed resins that may be cured at room temperature. Specifically, the resin is a combination of polyol, cardol, cardanol, derivatives or oligomers thereof and polyisocyanate or isocyanate. The resin is cured or encapsulated onto the fertilizer by activation with an amine catalyst. This process however was accomplished in a single reaction chamber or vessel.

Although methods of producing controlled release fertilizers utilizing a single drum or reactor (i.e. batch processing), are functional and commonly used, there are several problems associated with these methods. For example, in single drum processing, there is a higher tendency of generating clumps or balls of coated materials. As a result, the quality of the product is inferior and more variable and the operation of the drum or machinery may become unstable during operations. Additionally, single drum operations cannot handle highly viscous coating materials. This limits the single drum processes to liquid based coating systems and narrows the opportunity to use solvent free, high solid containing or solid coating systems.

Single drum operation involves (1) mixing the substrate and the coating material; and (2) curing of the coating in the same vessel. Mixing and curing are two different unitary operations that require different conditions. As such, using a single drum for both operations involves a compromise.

This is of special relevance when working with fast curing systems, high viscosity mixtures, and/or high throughput systems. For example, if coating of fast curing systems is performed in a single drum, it is unlikely that satisfactory mixing will be achieved before curing. This reduces the evenness of the coating. Furthermore, high viscosity mixtures have more stringent requirements for achieving satisfactory mixing. These requirements are not typically achieved in a single drum. Finally, high throughput systems involve over-sizing of equipment to allow enough residence time to ensure proper mixing and curing. Thus, the use of a single drum is not conducive for such methods.

In curing systems in which a gaseous catalyst is used, normal operation requires usually working with a discontinuous addition of catalyst creating cycles or pulses. See CA 2,115,998. This involves a complex process control and a possible suboptimal use of the catalyst itself.

Accordingly, there is a need in the art to develop efficient and effective methods and systems for coating substrates such as fertilizers.

SUMMARY OF THE PREFERRED EMBODIMENTS OF THE INVENTION

The present invention addresses these needs by providing various methods and systems for coating substrates.

In one embodiment, the invention provides for a method of coating a substrate that involves separating the mixing process from the curing process. In a particular embodiment, the method comprises (a) admixing a substrate and a coating material in a mixing device to form a coated mixture; and (b) transferring the coated mixture into a separate reactor, and curing the coated mixture in the reactor forming a coated substrate.

In another embodiment, this process is repeated to, for example, provide additional coating layers to the substrate. In particular embodiment, the method comprises (a) admixing a substrate and a coating material in a first mixing device to form a first coated mixture; (b) transferring the first coated mixture into a first reactor, and curing the first coated mixture in the first reactor to form a coated substrate with a first layer; (c) admixing the coated substrate of (b) with a coating material in a second mixing device to form a second coated mixture; and (d) transferring the second coated mixture into a second reactor, and curing the second coated mixture in the second reactor to form a coated substrate with a second layer, wherein the first reactor is separate and distinct from the first mixing device and optionally, the second reactor is separate and distinct from the second mixing device.

In another embodiment, the invention provides a system for coating substrates with a curable coating material. In a particular embodiment, the system comprises (a) at least one mixing device; and (b) at least one reactor that is separate and distinct from the mixing device, wherein the mixing device is capable of mixing a coating material with a substrate and the reactor is capable of curing the coating material. In an alternative embodiment, the system comprises (a) at least one mixing device capable of mixing a substrate and a coating a substrate; and (b) at least one separate means for curing a coated material.

In other embodiments, the invention provides that (a) the mixing device is a pugmill; (b) the reactor is a rotating drum or pan; or (c) the mixing device is a pugmill and the reactor is a rotating drum or pan.

DETAILED DESCRIPTION OF THE PREFERRED EMBODIMENTS OF THE INVENTION

Figure 1:
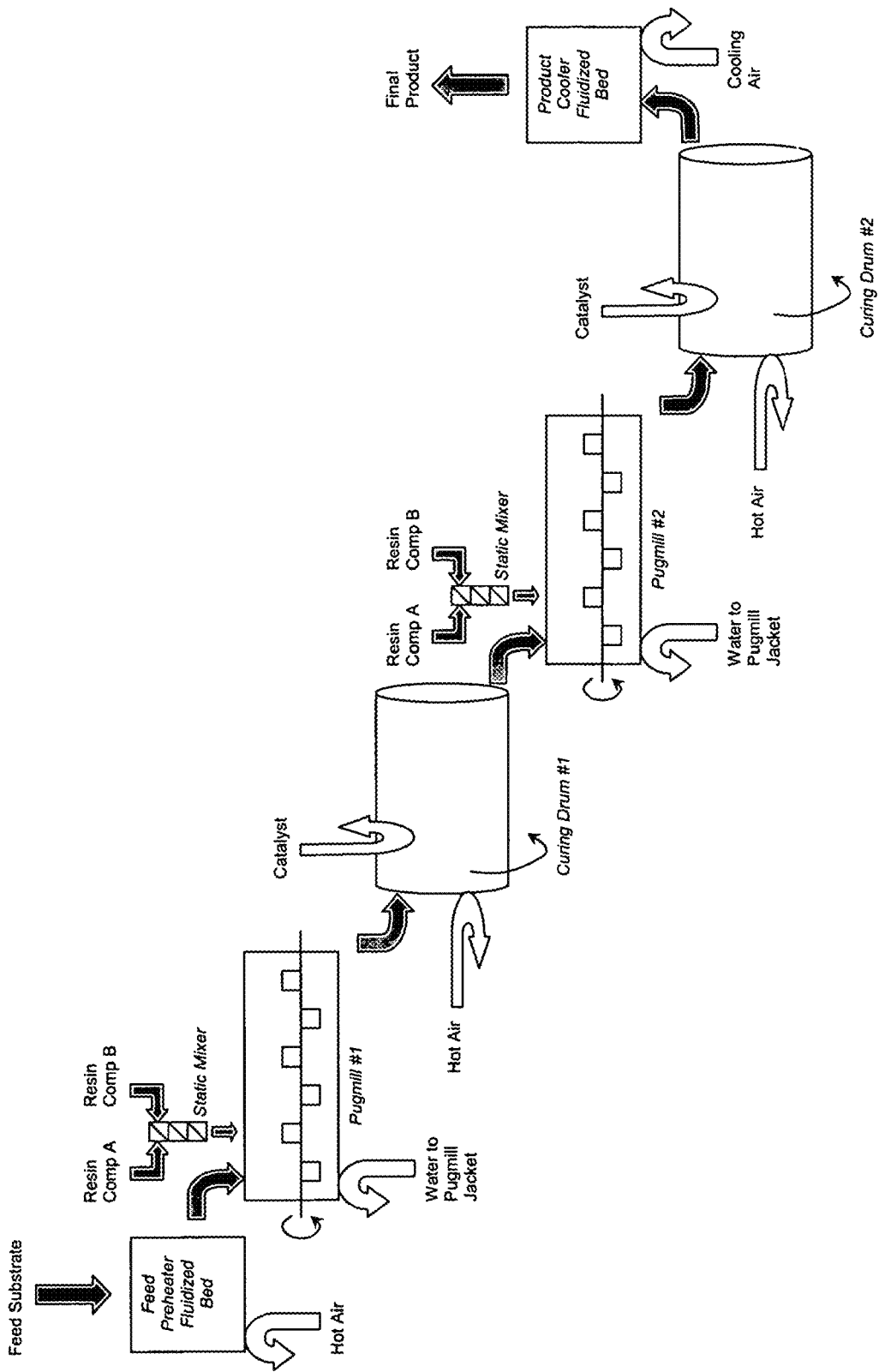
FIG. 1 provides a schematic diagram of an exemplary substrate coating method of the invention.

The invention provides for improved methods for coating substrates. For example, the invention provides for methods of preparing coated substrates by separating the step of mixing a substrate and coating material from the curing step. These methods involve mixing a substrate and a coating material in a mixing device, and then transferring the mixture into a separate reactor and curing the coated mixture. Optionally, the cured product is transferred into a second mixing device where additional coating material is added and mixed with the cured product. The second mixture may then be transferred into a separate second reactor for curing. This process may be repeated numerous times to achieve desired coating levels or designs.

The invention also provides for improved systems for coating substrates. These systems comprise at least one mixing device and at least one reactor that is separate and distinct from the mixing device. The mixing device is capable of mixing a coating material with a substrate, and the reactor is capable of curing the coating material.

The invention also provides for improved mixing devices for mixing substrates and coating materials. In particular, the invention provides for mixing devices such as pugmills.

The inventors have determined that the methods and systems for coating substrates described herein provide advantages over the single reactor methods currently used to coat substrates. By separating the coating and curing process, the inventors have unexpectedly discovered that the coating process can be more readily controlled. Surprisingly, separating the coating step from the curing step unexpectedly resulted in increased coating efficiency as well as decreased likelihood of premature curing of the coating materials. Moreover, the resulting coated substrates demonstrate a consistent release profile regardless of environment (e.g., potting mix, sand, soil) and thus may be used in a variety of controlled release applications.

Other advantages are gained by using the processes described herein. For example, the inventors have found that substrates can be coated with highly viscous coating materials. This allows for the use of high solids or even solventless coating systems. Additionally, the use of a continuous process unlocks the high throughput potential of fast curing systems, that results in freeing up equipment for other types of coating applications. The inventors have also discovered that, by separating the coating and curing processes, fouling of the equipment is reduced.

Thus, using the methods of the present invention, the number, types, and thickness of the layers may be controlled by separating the steps. Additionally, greater flexibility in the types of substrates, coating materials, and reaction conditions may be employed. Moreover, the methods and systems described herein may also be used in a continuous or batch process mode.

As described herein, various substrates, coating materials, curing methods, catalysts, mixing devices, and reactors may be used in these methods and systems.

(a) Substrates

The invention provides for various methods and systems for coating substrates. Substrates suitable for use in these methods and systems include any substance in which a coating is desired to be applied thereon.

Typically, the substrates are water soluble or partially water soluble substrates. The water soluble substrates may be in granular form, as opposed to non-granular form. The term "granular" or "granule(s)" refers to the compaction and/or agglomeration, by either physical or chemical means, of smaller particles into a single particle. Additionally, granules may also refer to a material made by a compaction process or granulation of non-granular or powdered substrates. The non-granular or powdered substrates may be homogenous or heterogeneous mixtures. As such, the substrate may be a homogenous granule consisting of a single blend, or alternatively, a heterogeneous granule or composite comprising of a mixture of substrates. The granular substrate may be in the form of a pellet, cake, prill, tablet, spherical granule or poly angular granule. The resultant granular substrate may range in sizes from about 20 size guide number ("SGN") to about 1000 SGN, more preferably about 50 SGN to about 500 SGN, and even more preferably about 100 or 150 SGN to about 300 or 400 SGN, even more preferably about 100 SGN to 400 SGN.

The granular substrate may include agricultural, medicinal, chemicals, agrochemicals or confectionary products. The agricultural products may include fertilizers, acaricides, avicides, bactericides, biocides, germicides, rodenticides, vulpicides, nutrient, defoliants, pH adjustors, soil conditioners, crop protecting agents, drying agents, antibiotic, pesticides such as herbicides, fungicides, growth regulators, insecticides, animal and insect repellants, molluscicides, nematocides, and mixtures or combinations thereof.

In a particular aspect, the granular substrate is a fertilizer. The fertilizer may be a single nutrient or a composite of various nutrients. Nutrients that may be used in the invention include, but not limited to ammonium nitrate, ammonium sulfate, ammoniated superphosphate, ammonium chloride, mono-ammonium phosphate, diammonium phosphate, calcium cyanamide, calcium nitrate, urea guanidine, guanidine nitrate and nitro guanidine, superphosphate and triple superphosphate, potassium nitrate, potash, potassium chloride, potassium sulfate, potassium metaphosphate, urea, urea phosphate and mixtures or combinations thereof. Those of skill in the art will appreciate that other fertilizers may be used in the methods and systems described herein.

In another particular aspect, the fertilizer comprises nitrogen ("N"), phosphorus ("P"), potassium ("K"), NPK, NP, NK, and PK. These elements may be combined in different ratios. For example, in one aspect, the NPK ratios may be 13-13-13, 27-0-0, 12-50-0, 0-0-50, 21-7-14, 15-15-15, or 10-11-18. Other ratios of NPK will be evident to those of skill in the art.

In another particular aspect, the fertilizer may contain secondary nutrients such as sulfur, magnesium, and calcium and/or micronutrients such as iron, manganese, zinc, copper, molybdenum, boron, and cobalt.

In another particular aspect, the fertilizer is urea. The urea may comprise various sizes. For example, the size of the urea is a SGN in the range of about 20 to about 1000 SGN, more preferably about 50 SGN to about 500 SGN, and even more preferably about 100 or 150 SGN to about 300 or 400 SGN, even more preferably about 100 SGN to 400 SGN.

Those of skill in the art will appreciate that various substrates may be applied to the methods and systems described herein. For example, the inventors have determined that the methods and systems described herein can be used to prepare controlled release fertilizers. Those of skill in the art, however, will appreciate that these methods and systems are applicable to a variety of substrates that can be coated with various coating materials. Variations in the combinations of the substrate and coating material will be apparent to those of skill in the art and may be optimized to achieve the desired final product.

U.S. Pat. No. 4,602,440 and Provisional Application No. 61/441,168, titled "Self-Cleaning Mixing Devices and Methods of Using the Same" filed Feb. 9, 2011, which are hereby incorporated by reference in their entireties, describe various substrates that are suitable for use in the methods and systems described herein.

(b) Coating Materials

The methods and systems of the invention involve coating substrates with various coating materials. Coating materials suitable for use in these methods and systems include, but are not limited to, water based latex coatings, molten resins, solvent based polymer coatings, water based polymers, edible coatings such as starches, gelatins, or hydrocolloid, high solid resins or paints, and solvent free resins or paints.

The coating material may be a water based latex coating. For example, the latex coating can be a polymeric insoluble latex material comprising copolymer blends of polyvinylidene chloride or ethylenically unsaturated co-monomers such as alkyl methacrylates, acrylonitriles, and alkyl acrylates, and mixtures thereof. Other water based latex coating are known in the prior art, such as those described in U.S. Pat. Nos. 3,223,518, 3,259,482, 3,264,088, and 3,264,089, which are hereby incorporated by reference in their entireties. The latex layer is capable of controlling the rate of nutrient release based on the coating weight and thickness of the polymeric coating.

The coating material may also be molten methylene urea resin, molten sulfur, molten waxes, polyurethane resins, alkyd resins, as well as other polymer systems.

The coating material may be a solvent based polymer. Solvent based polymers that may be used in the methods and systems of the invention are known in the art. See, e.g., U.S. Pat. Nos. 3,223,518 and 4,019,890, which are hereby incorporated by reference in their entireties.

The coating material may be a water based polymer. Water based polymers that may be used in the methods and systems of the invention are known in the art. For example, U.S. Pat. Nos. 4,549,897 and 5,186,732, which are hereby incorporated by reference in their entireties, provide examples of water based polymers coated in the absence of solvents.

In a particular aspect, the coating material is a synthetic water-permeable or vapor permeable polyurethane based resin or reaction products made therein. In a particular aspect, the resin is a reaction product of a two component system comprising a polyol component and a isocyanate component. In one embodiment, the polyol is a cardol, cardanol, or derivatives or oligomers of these compounds. In another embodiment, the isocyanate component is an polyisocyanate component. The cardol, cardanol, or derivatives or oligomers thereof may be obtained from a natural product and therefore considered as a renewable raw material. For example, the raw material may be cashew nut oils. U.S. Pat. No. 4,772,490 and 7,722,696, which are hereby incorporated by reference in their entireties, describe various resins comprising the reaction product of poylols, such as cardol, cardanol, or derivatives or oligomers thereof and polyisocyanate, such as isocyanates.

The coating materials embodied by present invention may also include either thermoset or thermoplastic resins. The choice of which type will be readily apparent to those of skill in the art based on the specific application of coating desired. In one embodiment of the invention, the thermoset resins may be chosen from, but not limited to epoxy polyester, vinylester, polyurethane, phenolicepoxies, or mixtures thereof. In another embodiment of the invention, the thermoplastic resins may be chosen from polyamide (PA or nylon), polyesters such as polybutylene terephthalate (PBT) and polyethylene terephthalate (PET), polycarbonate (PC), polyethylene (PE), polypropylene (PP), polyvinyl chloride (PVC), or combinations thereof.

(c) Curing Methods and Catalysts

The methods and systems of the invention involve curing coated mixtures. Those of skill in the art will understand that the step of curing may be performed using a variety of methods.

For the purposes of this invention the term "cure," "curing," or grammatical variations thereof are meant to include polymerization, chemical coalescence, coalescence of dispersions, chemical cross-linking, fusion of small particles, evaporation of solvents, physical drying by temperature change(s), coalescence of colloidal dispersions, fusion of colloidal dispersions, fusion of colloidal microparticles, setting, physical hardening, drying, or any finishing step that seals, solidifies, or hardens a liquid, semi-liquid, or viscous layer.

For example, curing may involve heating (or cooling) the coating mixture to a desired temperature thereby forming a hard coating. In one aspect, curing is performed by elevating the temperature by means of conduction, convection, or radiation heat. Thus, in one embodiment, the temperature may be within the range of 0° C. to about 110° C. In one preferred embodiment, the temperature range is 50° C. to about 110° C., 50° C. to about 100° C., 50° C. to about 90° C., 50° C. to about 80° C., 50° C. to about 70° C., or 50° C. to about 60° C. In another embodiment, the curing takes place at about 65° C. or 75° C. Curing may also be performed at room temperature.

Alternatively, curing may be accelerated by adding a catalyst. Catalysts that may be used in the step of curing are described in herein. In another aspect, curing in the presence of a catalyst may also occur either at ambient room temperature or in the presence of heat. It will be apparent to those of skill in the art that the temperature of the reactor may be modified to achieve the optimum curing times.

According to the various embodiments of this invention, the coating material, once coated on the substrate, is cured in a segregated reactor. The segregation of the mixing process and the curing process allows for the creation of a more uniformly coated substrate. Optionally, a catalyst may be added to decrease the time required for curing.

The curing process may be accelerated by adding catalysts to the reactor containing the coated mixtures. In one aspect, the catalysts can be added to the coated mixture in gaseous form, as gaseous mixtures with air, or as a liquid. The catalyst may be either an amine and or a metal catalyst in liquid form or solid form which can be admixed with or within the coating material.

Suitable amine catalysts that may be used in the methods and systems of the invention include, but are not limited to tertiary amine catalysts. For example, the amine catalysts that may be used include trimethyl amine, triethyl amine, dimethylethyl amine, dimethylisopropyl amine, dimethylethanol amine, vinyl imidazole, dimethylbutyl amine or 1,4-diazabicyclo[2.2.2]octane, or combinations thereof. Those of skill in the art will appreciate that other amine catalysts may also be used in the methods and systems of the invention.

Suitable metal catalysts that may be used include, but are not limited to dibutyltindilaurate, dibutyltin diacetate, iron acetylacetonate, manganese acetylacetonate, stannous carboxylates such as stannous octoate, potassium octoate, or combinations thereof. Those of skill in the art will appreciate that other metal catalysts may also be used in the methods and systems of the invention.

(d) Mixing Devices

The methods and systems of the invention involve the use of mixing devices. Those of skill in the art will appreciate that a mixing device is any device capable of blending, agitating, stirring, or mixing a substrate and coating material into a uniform blend.

Suitable mixing devices that may be used include, but are not limited to mixing devices such as pugmills, rotating drums, paddle mixers, nauta mixer, measuring mixers, extruders, ribbon blenders or pin mixers. Regardless of the type of mixing device used, suitable mixing devices comprise a mixing area or bed in which the mixing occurs. These may include pans, bins, troughs, beds, or any other container vessel that hold the substrates and coating materials. In particular embodiment, the mixing device should have a rotating and a static part.

The mixing devices may contain rotational elements capable of mixing substrates and coating material. The rotational elements may move bi-directionally or uni-directionally. The rotational elements may include paddles, stirrers, ribbons, spiral screws, pins, or combinations thereof. In one aspect, the rotational elements are paddles that may be oriented or angled in either a single direction, or alternatively, in opposing directions. The orientation and or angling of the paddles will be apparent to those of skill in the art based on the particular degree of mixing or agitation required and the type of operation (e.g., batch or continuous).

In a particular aspect, the mixing device is a pugmill. The inventors have determined that the use of a pugmill is advantageous in the preparation of coating substrates. Indeed, a pugmill allows for the manipulation and control of a variety of mixing conditions. For example, a pugmill may be modified to control temperature, atmospheric conditions of mixing, the entry point/injection point of the coating materials, and the direction and orientation of the mixing. As such, premature curing of a coated mixture may be prevented by controlling the atmospheric conditions of the pugmill, e.g., performing the mixing step in a pugmill in the presence of an inert nitrogen gas. These and other advantages may be realized using a mixing device in the methods and systems of the invention.

In another aspect, the mixing device comprises specific rotational elements that allow for movement of the substrates and coating materials in a bi-directional manner. Prolonged mixing of substrate and coating materials may cause fouling in the mixing device. The inventors also unexpectedly discovered that intermittent movement of the rotational elements in the opposite direction for a specified duration of time increases the efficiency of the coating process. Thus, in one aspect, the mixing device is designed to rotate the rotational elements, such as the paddles of the pugmill, in the forward rotational direction followed by rotation of the rotational elements in the reverse rotational direction for an interval shorter that the forward direction. This aspect, as well as mixing devices suitable for use in the methods and systems described herein, are described in Provisional Application No. 61/441,168, titled "Self-Cleaning Mixing Devices and Methods of Using the Same" filed Feb. 9, 2011, which is hereby incorporated by reference in its entirety.

In another aspect, the mixing device comprises rotating paddles that may be attached to a moving axel.

In another aspect, the mixing device may comprise mechanisms for introducing coating materials. For example, a mixing device, such as a pugmill, may comprise injection tubes and/or mixers that are capable of introducing coating materials into the mixing device. The point of introduction is defined as the injection point. These injection points may be free to move transversely along the length of the pugmill in a continuous manner to ensure equal mixing on the whole mixing area. The point of injection may be adjusted and optimized depending on the choice of substrates or resin formulations. Alternatively, the coating material may be sprayed on or into the mixing device.

In another aspect, the mixing device is part of a system configured in-line with a series of other mixing devices and reactors. These in-line systems allow for either continuous or batch processing of substrates for coating multiple layers onto a desired substrate.

(e) Reactors

The methods and systems of the invention involve curing coated mixtures in a reactor. For the purposes of this invention a "reactor," "reaction chamber," or "reaction vessel," refers to a locus in which curing occurs. Those of skill in the art will appreciate that the reactor may be any device that is capable of curing a coated mixture. Reactors that may be used include, but are not limited to rotating drums, rotating tubs, rotating pans, or rotating pipes, fluidized beds, spouted beds, Wurster apparatus, or any vessel, chamber, or container which allows for curing. The reactor may be configured for various types of curing as described above. For example, the reactor may be configured to be heated to a certain temperature range or temperature, or to discharge various curing aids such as catalysts into the reactor.

In one aspect, the reactor is separate and distinct from the mixing device. The reactor embodied by the instant invention is designed specifically for the curing of coated mixture to be performed as described in the curing section above. Thus, mixing or blending as described in the present invention is accomplished in a device which is separate from and does not include the reactor in which curing proceeds. Thus, in one embodiment, the method of coating a substrate is accomplished by blending or mixing a substrate and a coating material in a mixing device and transferring the coated mixture to separate reactor in which the curing will take place. Thus in one embodiment, the mixing device may be a pugmill, which then transfers the coated mixture into a reactor such as a rotating drum. Those of skill in the art will appreciate that any mixing device and reactor may be chosen so long as the mixing or blending occurs separately from the curing.

In another embodiment of the invention, a coated mixture, which has been blended in a pugmill, is directly fed and received into a first reactor which cures the mixtures generating a coated substrate. Optionally, the first reactor may subsequently transfer the coated substrate into a second pugmill for additional mixing with coating material and then transferred to a second reactor for a second curing event.

(f) Methods and Systems for Coating Substrates

For the purposes of this invention, a "coated substrate" according to the instant invention refers to a substrate which has been encapsulated by a coating material which has been cured. The coated substrate may comprise a single cured layer, herein referred to as a "first coated substrate" or may comprise two cured layers, herein referred to as a "double coated substrate", secondary coated substrate, "two layered substrate", or some equivalent thereof that will be readily apparent to those of skill in the art. Those coated substrates comprising more than at least two layers will be referred to as "multilayer-coated substrates" or some equivalent readily apparent to those of skill in the art. A multilayer coated substrate may include between three to about ten additional layers of cured coating material. For example, if the substrate is a fertilizer, the term "coated fertilizer" will refer to a granular fertilizer which has been encapsulated within a cured coating material.

For the purposes of this invention a "coated mixture(s)" is defined as substrates which have been enveloped with a coating material as a result of mixing or blending within a mixing device.

As discussed herein, the methods of coating a substrate according to the embodiments of this invention involves at least two essential steps. The first step involves the combination of a substrate and a coating material. Both the types of substrates and coating materials have been described herein. The aforementioned combination is mixed in a mixing device for a duration of time to sufficiently blend them into a coated mixture. In general, the types of mixing devices suitable for blending the substrates and coating materials are rotating drums, paddle mixers, nauta mixer, pugmills, pin mixers, ribbon blenders, extruders or measuring mixers. In one embodiment, the mixing device is a pugmill. The pugmill is accessorized with paddles or pins which blend the coated mixtures.

Once the coated mixture is properly blended, it is transferred into a separate reactor which provides an environment in which the coated mixture is cured. The environment suitable for curing may be dictated by temperature or by the presence of a catalyst. In one embodiment, the temperature at which the coated mixture is cured is in the range of about 50° C. to about 100° C. Preferably, the reactor is set at a temperature of about 65° C. or 70° C. In yet another embodiment, the reactor is at ambient temperature but the curing is accelerated by the presence of a catalyst. The types of catalysts suitable for curing the coated mixtures are mentioned herein and those of skill in the art will appreciate the types of catalysts which may be used to accelerate the curing process. The mixing devices and reactors may be placed in ventilation hoods to collect gases released from the process. For example, high concentration of gaseous amine catalysts which are released from the method is neutralized with a sulfuric acid solution. The neutralized gas is then released into atmosphere.

It will be apparent to those of skill in the art that the method and process described herein may be repeated numerous times. Those in the field will appreciate that variables such as thickness, coat weight, or different layers and purpose of the coating will dictate the number of times and types of coating materials added in each subsequent repetition of the process. Thus, in one embodiment, the method may be repeated exactly (i.e. using the same coating materials and curing times, heat, and/or presence of a catalyst) to achieve a multilayered coated substrate. In another embodiment, the method may be repeated, but the types of coating materials added in each successive repetition of the method may be different. Additionally the weight of the coating material added in each successive step may either be the same or different. For example, if a final coat weight of 4% is desired, successive steps may be used to apply the coating material, either in equal amount or in differential amounts (e.g. first 3% followed by 1% coating).

Those of skill in the coating arts understand that the method of coating a substrate may be performed in batches or in a continuous process. The choice of batch or continuous processing may depend on a variety of factors. For example, the variation in the substrate and coating materials used in making the coated substrate, the cycle times between generating a mixture and the required curing times, and the economic factors of establishing a continuous production line. Those of skill in the art will appreciate that the method of the instant invention may be adapted to either production scheme.

In yet another embodiment of the invention, the process of coating a substrate may be accomplished through a system. A system suitable for coating a substrate comprises a mixing device and a reactor. In an alterative embodiment, the system may comprise at least two mixing devices and at least two reactors. The mixing devices and reactors suitable for use in the system may include any of those described herein.

The methods and systems of the invention may be used to produce coated substrates such as fertilizers. The coated substrates of the invention are useful in a variety of controlled release applications. For example, the coated substrate may be released over 1, 2, 3, 4, 5, 6, or more months in distinct environments such as potting mix, soil, or sand.

EXAMPLES

The following examples describe various methods and systems contemplated by the invention. These examples are not intended to limit the methods, systems, mixing devices, reactors, substrates, coating materials, or methods of curing contemplated by the invention. Rather, these examples are intended to describe particular embodiments of this invention in more detail.

General Methods (a) Coating a Fertilizer with a Controlled Release Polymer

A series of pugmills and rotating drums were configured to establish a continuous processing scheme as shown in FIG. 1.

In this particular scheme, the process was optimized for coating granules at a rate of approximately 250 kg per hour. The polyurethane based resin used in the examples was made by reacting a liquid polyol (Askocoat EP 7717) and a liquid diisocyanate (Askocoat EP 05547 Comp B). See, e.g., U.S. Pat. No. 7,722,696, which is hereby incorporated by reference herein in its entirety. The target substrates for coating in the examples include the following soluble fertilizers: urea of SGN 220 or 150 or NPK It is understood that other resins/coatings and substrates, as described herein, may be used.

Fertilizer granules were placed into a hopper that feeds the granules into a fluidized bed. The fluidized bed was preheated by air flow to approximately 45° C. The preheated granules were then transferred into a first pugmill for mixing with the polyol resin. The two resin components (i.e., polyol and diisocyante) were each separately pumped into a static mixer before injection into the pugmill via two stainless steel tubes. The flow of the two resin components into the static mixer was controlled by mass-flow controllers. Mixing the resin components immediately before injection avoided any unwanted curing in the steel tubes.

The fertilizer and resin were added to a pugmill configured to mix and blend the components into a coated mixture. Each pugmill comprised two shafts with fifteen paddles each with a capacity of approximately 25 liters. The pugmill was equipped with a 3.7 kW and 60 Hz motor. The pugmill was also insulated for temperature control and equipped with a removable upper cover to control the atmospheric conditions under which blending will occur. An inert nitrogen gas was pumped into the pugmill to prevent the unwanted and premature curing of the resin.

Once the granules were enveloped by the resin to form a coated mixture, it was discharged into first reactor—a rotating curing drum. The drum was heated to approximately 65° C. with a rotation of approximately at 8.5 rpm. A liquid catalyst (e.g. N,N-dimethylisopropylamine; Sigma Aldrich) was flushed with nitrogen to generate a gaseous catalyst. The catalytic gas was introduced into the rotating drum by a perforated pipe. Coated and cured fertilizers exited the first rotating drum and entered the second pugmill. In the second pugmill, additional coating materials were added, as described above, and the secondary coated mixtures were subsequently transferred into to a second rotating drum for curing. Product typically exited the second pugmill at approximately 55° C. and the second rotating drum at approximately 70° C.

The coated and cured fertilizers produced consisting of two cured layers of coating material were cooled down in a fluidized bed to approximately 30° C. A screening process was conducted to remove any agglomerates or fine particles.

(b) Testing the Coated Fertilizers Produced

The performance of the coated fertilizer was measured by the rate of nutrient release from the granule when contacted with water. Slower release rates indicate longer longevity of the product in terms of releasing its nutrients over time.

1. Water Leach Test and Rapid Release Profile Test

The industry standards for determining the release characteristics of the product include the water leach test and rapid release profiles test (used only for testing urea).

In the water release test, coated NPK fertilizers were placed in water at 21° C. and tested at two time intervals, 24 hours and 7 days. In particular, twenty grams of coated fertilizer was placed into a flask with 400 mL of de-mineralized water. The flask containing the sample was inverted three times to allow for mixing and kept at 21° C. After a 24 hour period, the flask was inverted three times and a sample was taken to determine the amount of nitrogen, phosphorus and potassium in the water. The water was replaced and renewed with 400 mL of fresh de-mineralized water. The measurement was repeated again after 7 days. After the test the remaining particles were milled, dissolved to a known volume and analyzed to check closure of the mass balance for each component. Results are given as weight % of N, $P_2O_5$ and $K_2O$ released into the solution in one day and in seven days.

The rapid release tests were performed using coated fertilizers made of urea. In particular, twenty five grams of coated fertilizer was placed in 900 mL of de-mineralized water and kept at a constant temperature of 65° C. Samples were taken every hour for 24 hours. The concentration of urea released into the water was measured by refractivity index. Results are given as wt % of nitrogen released in the solution vs. time.

2. Percent Release Using Various Coating Weights in Different Conditions.

The release of fertilizers coated with various weights (3%, 4%, 5%, 6%) were tested over three months, in three different environments: potting mix (also referred to as bark mix), quartz sand, and soil. The bags used in each environment contained the same mass of fertilizer. Percent release was evaluated at 2, 4, 8, and 12 weeks.

SPECIFIC EXAMPLES

As a comparison baseline, the behavior of uncoated materials was tested in the water leach test, as described herein, and is summarized in Table 1. The materials used in this control test were 220 SGN granulated urea, 150 SGN granulated urea, and granulated NPK 13-13-13.

TABLE 1

| 21° C. water leaches for uncoated materials | |
| --- | --- |
| Material | Time for 80% release (h) |
| Urea SGN 220 | <0.5 |
| Urea SGN 150 | <0.5 |
| NPK 13-13-13 | ~4 |

Example 1

Coated 220SGN Urea in the Water Leach Test Processed at 230 Kilograms Per Hour

Figure 2:
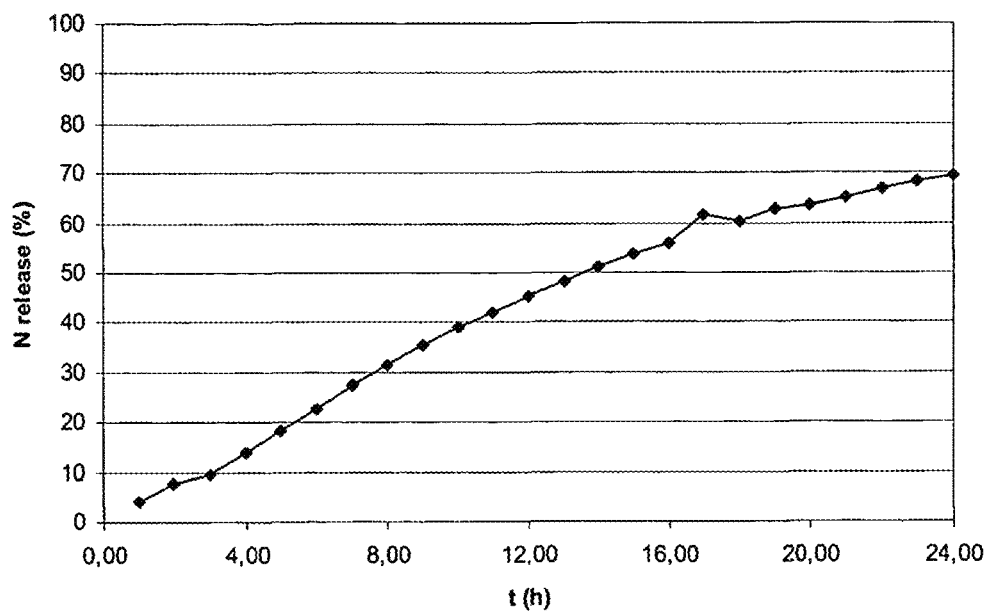
FIG. 2 shows the results of a rapid release test (65° C.) for coated 220SGN urea processed at 230 kilograms per hour.

Screened 220 SGN urea was processed at a rate of 230 kg/h in the described system to achieve a coating weight of 4.3%. Two equivalent layers of polyurethane (i.e. 2.15% in each layer) were added to the granules, one layer in each pugmill/drum stage. Operation conditions and results can be seen in Table 2 and FIG. 2.

TABLE 2

| Operation conditions water leach results | |
| --- | --- |
| CONDITIONS | |
| Feed | Urea SGN 220 |
| Feed Rate (kg/h) | 230 |
| Resin | Polyurethane Askocoat (EP7717 + EP05547) |
| Coating weight (wt %) | 4.3 |
| Pugmill # 1 speed (rpm) | 20 |
| Pugmill # 2 speed (rpm) | 20 |
| Drum # 1 speed (rpm) | 8.5 |
| Drum # 2 speed (rpm) | 6 rpm |
| RESULTS, 21° C. Water Leach | |
| 24 h release (N %) | 5.3 |
| 7 days release (N %) | 24.5 |

Product performance was very satisfactory providing a controlled release and very low initial release for the reported coating weight.

Example 2

Coated 220SGN Urea in the Water Leach Test Processed at 450 Kilograms Per Hour

Figure 3:
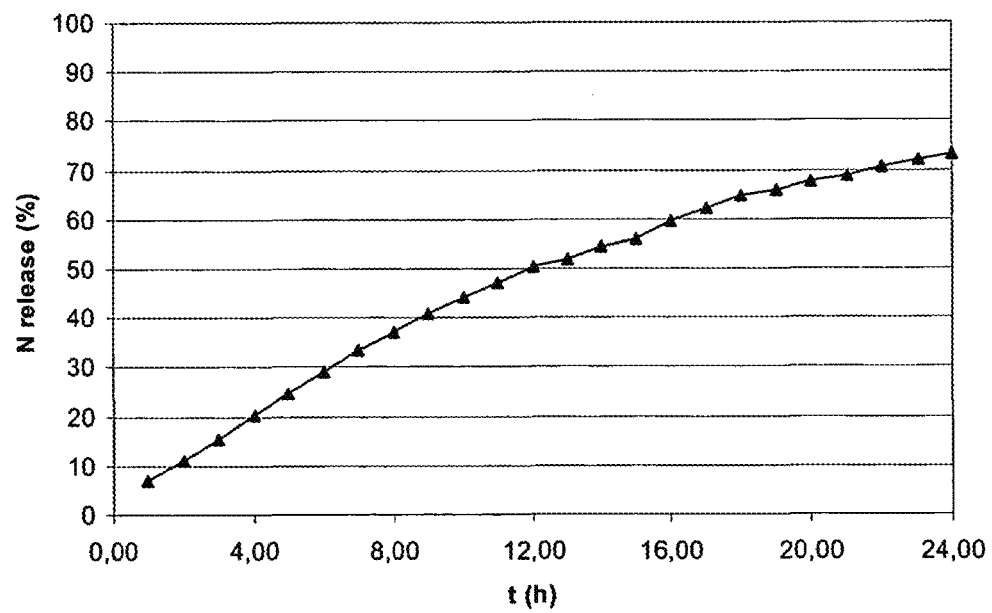
FIG. 3 shows the results of a rapid release test (65° C.) for coated 220SGN urea processed at 450 kilograms per hour.

In this example, the production rate was increased to 450 kg/h. Speeds of drums and pugmills were adapted to handle the increased rates. The coating weight was unchanged from the previous example, thus a 4.3% coating weight in two equivalent layers of polyurethane (i.e., 2.15% in each layer) was applied in each pugmill. Operation conditions and results can be seen in Table 3 and FIG. 3.

TABLE 3

Operation conditions for water leach results

| CONDITIONS | |
|---|---|
| Feed | Urea SGN 220 |
| Feed Rate (kg/h) | 450 |
| Resin | Polyurethane Askocoat (EP7717 + EP05547) |
| Coating weight (wt %) | 4.3 |
| Pugmill # 1 speed (rpm) | 44 |
| Pugmill # 2 speed (rpm) | 44 |
| Drum # 1 speed (rpm) | 10 |
| Drum # 2 speed (rpm) | 10 |
| RESULTS, 21° C. Water Leach | |
| 24 h release (N %) | 11.4 |
| 7 days release (N %) | 36.8 |

Product release rate increased as compared to the 250 kg/h coated urea. This example demonstrates the flexibility of the pugmill-rotating drum process/system to adapt to faster rates (almost double the design capacity) of coating without a detrimental sacrifice in quality.

Example 3

Coated 150SGN Urea in the Water Leach Test Processed at 230 Kilograms Per Hour

Figure 4:
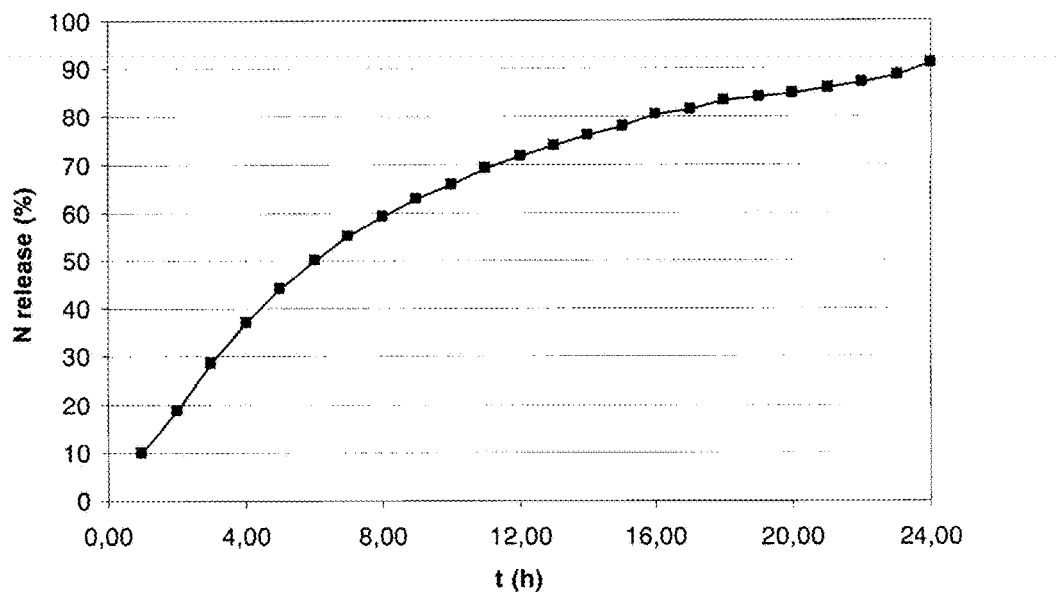
FIG. 4 shows the results of a rapid release test (65° C.) for coated 150SGN urea processed at 230 kilograms per hour.

Screened 50 SGN urea was processed at a rate of 230 kg/h. The coat weight was increased to 5.5% (i.e., 2.75% in each layer) in two equivalent layers of polyurethane, applied in each pugmill. Speeds of pugmills were adapted to handle the smaller particle size substrate. Operation conditions and results can be seen in Table 4 and FIG. 4.

TABLE 4

Operation conditions for water leach results

| CONDITIONS | |
|---|---|
| Feed | Urea SGN 150 |
| Feed Rate (kg/h) | 230 kg/h |
| Resin | Polyurethane Askocoat (EP7717 + EP05547) |
| Coating weight (wt %) | 5.5 |
| Pugmill # 1 speed (rpm) | 30 |
| Pugmill # 2 speed (rpm) | 30 |
| Drum # 1 speed (rpm) | 8.5 |
| Drum # 2 speed (rpm) | 8.5 |
| RESULTS, 21° C. Water Leach | |
| 24 h release (N %) | 20.0 |
| 7 days release (N %) | 65.2 |

It is generally known that coating smaller sized granules is challenging and requires increased coating weights because of its increased surface area. This example demonstrates that this system can coat smaller granules successfully.

Example 4

Coated 13-13-13 NPK in the Water Leach Test Processed at 270 Kilograms Per Hour

A granulated 13-13-13 NPK substrate (13% N, 13% $P_2O_5$ and 13% $K_2O$) was processed at a rate of 270 kg/h. Three different coating weights were used for this substrate: 4.3%, 5% and 6%, each being applied in equivalent layers of polyurethane. Speeds were adapted for the different density of the substrate. Operation conditions and results can be seen in tables 5, 6, and 7.

TABLE 5

Operation conditions for water leach results (coating weight 4.3%)

| CONDITIONS | |
|---|---|
| Feed | NPK 13-13-13 |
| Feed Rate (kg/h) | 270 |
| Resin | Polyurethane Askocoat (EP7717 + EP05547) |
| Coating weight (wt %) | 4.3 |
| Pugmill # 1 speed (rpm) | 30 |
| Pugmill # 2 speed (rpm) | 30 |
| Drum # 1 speed (rpm) | 8.5 |
| Drum # 2 speed (rpm) | 8.5 |
| RESULTS, 21° C. Water Leach | |
| 24 h release (N %) | 12.6 |
| 24 h release ($P_2O_5$ %) | 10.0 |
| 24 h release ($K_2O$ %) | 5.2 |
| 7 days release (N %) | 42.2 |
| 7 days release ($P_2O_5$ %) | 36.2 |
| 7 days release ($K_2O$ %) | 21.8 |

TABLE 6

Operation conditions for water leach results (coating weight 5%)

| CONDITIONS | |
|---|---|
| Feed | NPK 13-13-13 |
| Feed Rate (kg/h) | 270 |
| Resin | Polyurethane Askocoat (EP7717 + EP05547) |
| Coating weight (wt %) | 5 |
| Pugmill # 1 speed (rpm) | 30 |
| Pugmill # 2 speed (rpm) | 30 |
| Drum # 1 speed (rpm) | 8.5 |
| Drum # 2 speed (rpm) | 8.5 |
| RESULTS, 21° C. Water Leach | |
| 24 h release (N %) | 5.9 |
| 24 h release ($P_2O_5$ %) | 4.8 |
| 24 h release ($K_2O$ %) | 1.8 |
| 7 days release (N %) | 26.5 |
| 7 days release ($P_2O_5$ %) | 22.2 |
| 7 days release ($K_2O$ %) | 11.2 |

TABLE 7

Operation conditions for water leach results (coating weight 6%)

| CONDITIONS | |
|---|---|
| Feed | NPK 13-13-13 |
| Feed Rate (kg/h) | 270 |
| Resin | Polyurethane Askocoat (EP7717 + EP05547) |
| Coating weight (wt %) | 6 |
| Pugmill # 1 speed (rpm) | 30 |
| Pugmill # 2 speed (rpm) | 30 |
| Drum # 1 speed (rpm) | 8.5 |
| Drum # 2 speed (rpm) | 8.5 |
| RESULTS, 21° C. Water Leach | |
| 24 h release (N %) | 5.5 |
| 24 h release ($P_2O_5$ %) | 4.7 |
| 24 h release ($K_2O$ %) | 2.0 |
| 7 days release (N %) | 22.8 |
| 7 days release ($P_2O_5$ %) | 20.0 |
| 7 days release ($K_2O$ %) | 10.5 |

These examples demonstrate that a NPK substrate can be coated successfully and that coating weight can be adapted to achieve a desired release profile.

Example 5

Percent Release Using Various Coating Weights in Different Environments

The release of coated fertilizers (coating weights of 3%, 4%, 5%, and 6%) were tested in bark mix, quartz sand, and soil. The operating conditions for each fertilizer were as follows:

| | 3% | 4% | 5% | 6% |
|---|---|---|---|---|
| feed | urea SGN 220 | urea SGN 220 | urea SGN 220 | urea SGN 220 |
| resin | polyurethane askocoat (EP7717 + EP05547) | polyurethane askocoat (EP7717 + EP05547) | polyurethane askocoat (EP7717 + EP05547) | polyurethane askocoat (EP7717 + EP05547) |
| actual coating weight | 2.9% | 4.2% | 4.6% | 5.7% |
| total nitrogen | 44.7 | 44.1 | 43.9 | 43.4 |
| coating application | 2 layers - 1.5% in each layer | 2 layers - 2.15% in each layer | 2 layers - 2.5% in each layer | 4 layers - 1.5% in each layer |
| NCO index | 1.6 | 1.6 | 1.6 | 1.6 |
| urea feed rate | 500 lb/hr | 500 lb/hr | 500 lb/hr | 500 lb/hr |
| pugmill speed | 20 rpm | 20 rpm | 20 rpm | 20 rpm |
| drum speed | 8 rpm | 8 rpm | 8 rpm | 8 rpm |

Figure 5:
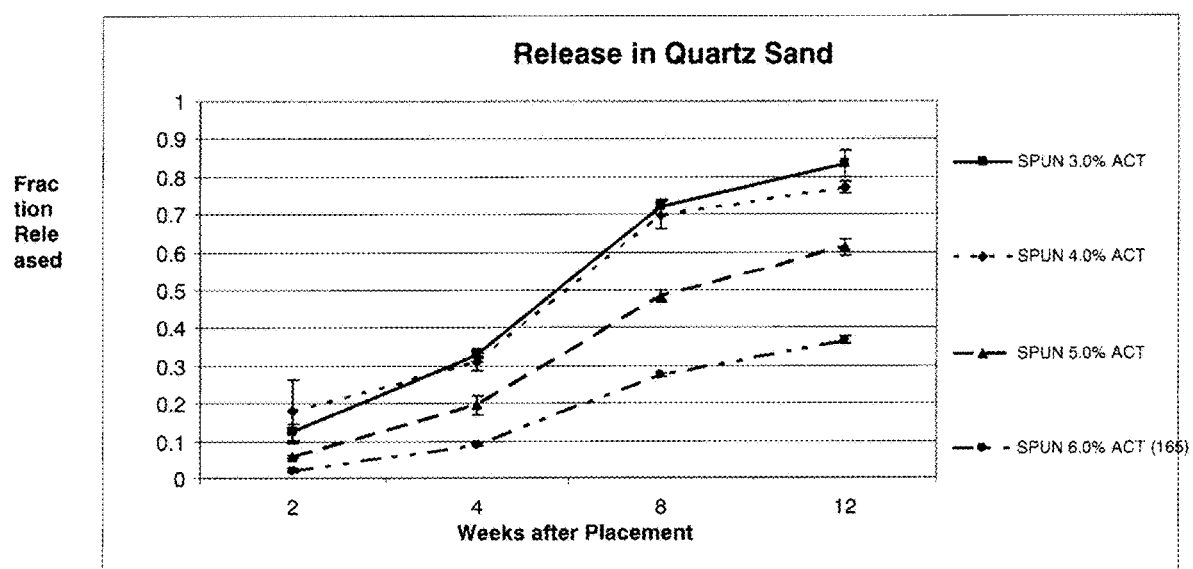
FIG. 5 shows the release of coated fertilizers over time in quartz sand. The coating weights (from top to bottom on the graph) were 3.0%, 4.0%, 5.0%, and 6.0%.
Figure 6:
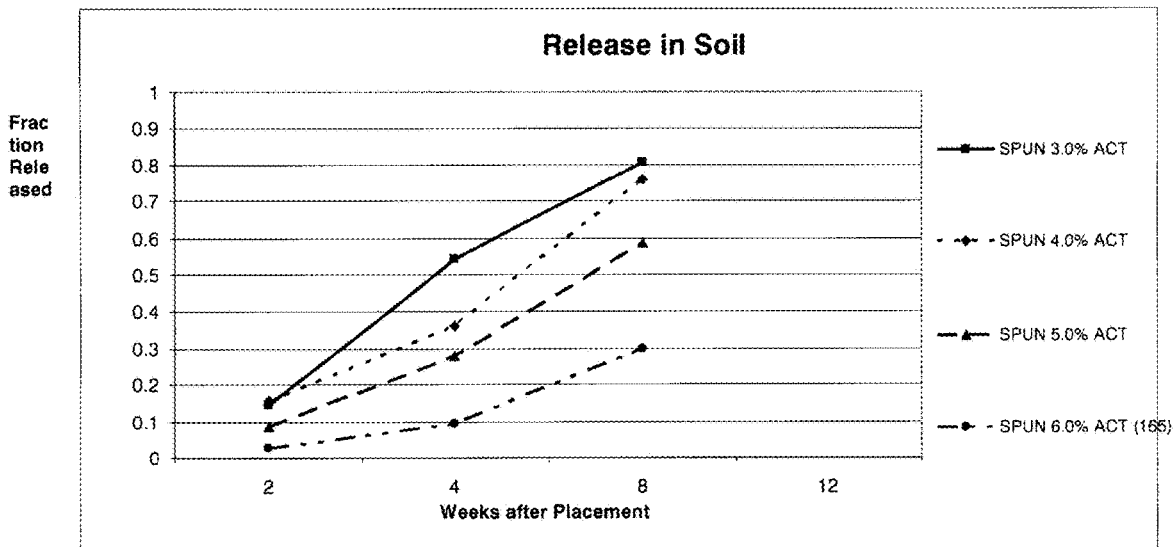
FIG. 6 shows the release of coated fertilizers over time in soil. The coating weights (from top to bottom on the graph) were 3.0%, 4.0%, 5.0%, and 6.0%.
Figure 7:
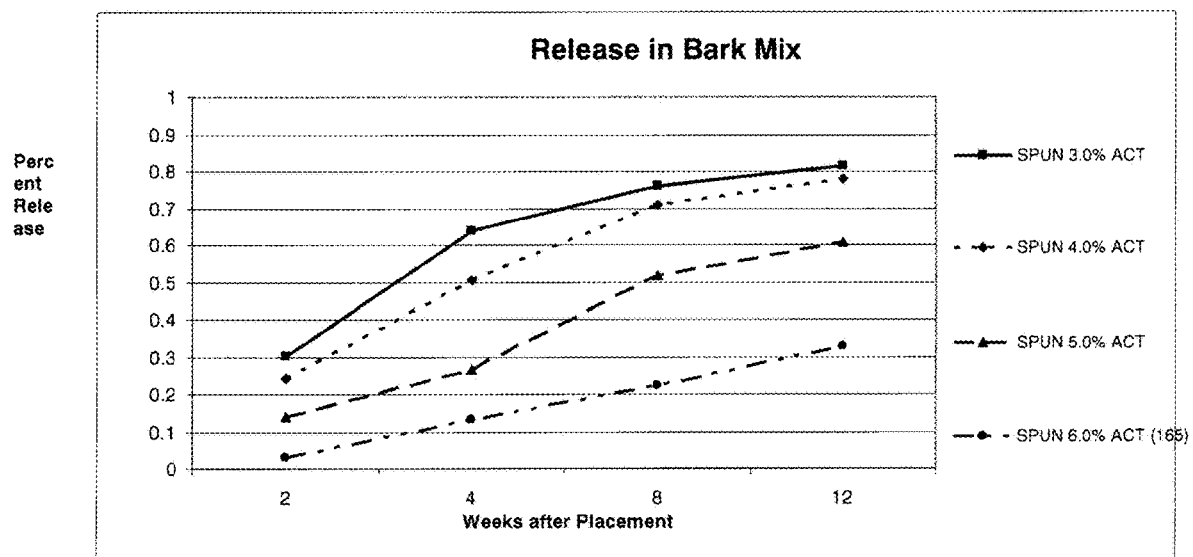
FIG. 7 shows the release of coated fertilizers over time in bark mix. The coating weights (from top to bottom on the graph) were 3.0%, 4.0%, 5.0%, and 6.0%.

FIGS. 5-7 show the results from this experiment. The results demonstrate a consistent release profile of the coated fertilizers, over three months, regardless of environment (potting mix, sand, soil). As such, the methods of the invention are capable of producing coated substrates that hold up over time in distinct environments.

In sum, the methods and systems of the invention provide for efficient and effective means for producing coated substrates such as fertilizers. The experimental results demonstrate, among other things, that the production rate of the coating process may be increased without sacrificing the quality of the coating on the substrate. Moreover, the coated substrates exhibit a consistent release profile and thus may be used in a variety of controlled release applications.

The invention claimed is:

1. A method of coating a granular fertilizer comprising the steps of:
   (a) a mixing process comprising admixing the granular fertilizer and a curable thermoset resin in a mixing device to form a coated mixture, wherein the mixing device is a pugmill, paddle mixer, ribbon blender, pin mixer, measuring mixer, or nauta mixer; and
   (b) transferring said coated mixture into a separate reactor, and a curing process comprising curing said coated mixture in the reactor to form a coated substrate;
   wherein the mixing device is separate and distinct from the reactor;
   wherein the method further comprises adding a catalyst to the reactor;
   wherein the mixing process and the curing process are segregated.

2. The method of claim 1, wherein said method further comprising the steps of:
   (a) admixing the coated substrate of (b) with a second coating material in a second mixing device to form a second coated mixture; and
   (b) transferring said second coated mixture into a second and separate reactor and curing said second coated mixture in the reactor to form a coated substrate with a second layer.

3. The method of claim 1, wherein the granular fertilizer is water soluble or partially water soluble.

4. The method of claim 1, wherein the curable thermoset resin comprises a polyol component and an isocyanate component.

5. The method of claim 4, wherein the polyol component comprises a natural product which is a renewable raw material.

6. The method of claim 5, wherein the raw material is derived from cashew nut oil.

7. The method of claim 5, wherein the polyol is cardol, cardanol, derivatives, or oligomers thereof.

8. The method of claim 1, wherein said method further comprises adding an amine and/or metal catalyst to the reactor or the curable thermoset resin.

9. The method of claim 1, wherein said reactor is heated to a temperature range of 50-100° C.

10. The method of any claim 1, wherein the process is a continuous process.

11. The method of claim 1, wherein the mixing device is a pugmill.

12. The method of claim 1, wherein the granular fertilizer and the curable thermoset resin are mixed in the mixing device in the presence of an inert nitrogen gas.

13. A method of preparing controlled-release fertilizer comprising the steps of:
  (a) a mixing process comprising admixing a granular fertilizer and a curable thermoset resin in a mixing device to form a coated mixture, wherein the mixing device is a pugmill, paddle mixer, ribbon blender, pin mixer, measuring mixer, or nauta mixer; and
  (b) transferring said coated mixture into a separate reactor, and a curing process comprising curing said coated mixture in the reactor to form a coated substrate, wherein the mixing device is separate and distinct from the reactor;
  wherein the method further comprises of adding a catalyst to the reactor;
  wherein the mixing process and the curing process are segregated.

14. The method of claim 13, wherein the resin comprises a polyol component and an isocyanate component.

15. The method of claim 13, wherein the resin is selected from a group consisting of epoxy polyester, vinylester, polyurethane, phenolicepoxies, and mixtures thereof.

16. The method of claim 13, wherein the resin is selected from a group consisting of polyamide, polybutylene terephthalate, polyethylene terephthalate, polycarbonate, polyethylene, polypropylene, polyvinyl chloride, or combinations thereof.

* * * * *